(12) United States Patent
Ratner

(10) Patent No.: US 9,097,361 B1
(45) Date of Patent: Aug. 4, 2015

(54) ACTUATED ELASTOMER VALVE

(71) Applicant: Google Inc., Mountain View, CA (US)

(72) Inventor: Daniel Ratner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 242 days.

(21) Appl. No.: 13/861,451

(22) Filed: Apr. 12, 2013

(51) Int. Cl.
*F16K 31/06* (2006.01)
*B64B 1/64* (2006.01)
*B64B 1/62* (2006.01)

(52) U.S. Cl.
CPC ............ *F16K 31/0675* (2013.01); *B64B 1/64* (2013.01); *B64B 1/62* (2013.01)

(58) Field of Classification Search
CPC ............ B64B 1/62; B64B 1/64; B64B 1/40; B64B 1/58; F16K 31/0675
USPC ................ 251/82, 129.15, 205, 212
See application file for complete search history.

(56) References Cited

U.S. PATENT DOCUMENTS

| | | | | |
|---|---|---|---|---|
| 1,289,703 | A * | 12/1918 | Dutton | 244/99 |
| 1,408,603 | A * | 3/1922 | Kappes | 251/243 |
| 1,516,732 | A * | 11/1924 | Jaray | 244/99 |
| 1,615,016 | A * | 1/1927 | Kraft | 251/318 |
| 2,266,836 | A * | 12/1941 | Weidner | 137/81.1 |
| 2,403,801 | A * | 7/1946 | Isom et al. | 251/353 |
| 2,740,598 | A * | 4/1956 | Van Krevelen | 244/96 |
| 3,336,000 | A * | 8/1967 | Barker | 251/212 |
| 3,672,233 | A * | 6/1972 | Hjermstad et al. | 74/2 |
| 3,860,201 | A * | 1/1975 | Hall | 244/99 |
| 4,067,540 | A * | 1/1978 | Slade | 251/63.4 |
| 4,511,116 | A | 4/1985 | Jackson | |
| 4,564,159 | A * | 1/1986 | Hill et al. | 244/98 |
| 4,807,780 | A * | 2/1989 | Parsons et al. | 221/113 |
| 4,948,092 | A * | 8/1990 | Kasper et al. | 251/82 |
| 5,078,361 | A * | 1/1992 | Nordman | 251/7 |
| 5,409,144 | A * | 4/1995 | Brown | 222/185.1 |
| 5,482,492 | A | 1/1996 | Becker | |
| 6,119,725 | A * | 9/2000 | Shinobu et al. | 137/554 |
| 6,135,311 | A * | 10/2000 | Panec et al. | 220/705 |
| 6,766,824 | B2 * | 7/2004 | Taylor | 137/522 |
| 8,261,777 | B2 | 9/2012 | Doig | |

FOREIGN PATENT DOCUMENTS

GB          610508          10/1948

* cited by examiner

*Primary Examiner* — Tien Dinh
*Assistant Examiner* — Alexander V Giczy
(74) *Attorney, Agent, or Firm* — McDonnell Boehnen Hulbert & Berghoff LLP

(57) ABSTRACT

The present disclosure provides an apparatus and method for actuating an elastomer valve. The apparatus includes a first solenoid at least partially surrounding a first moveable member. The apparatus also includes a second solenoid at least partially surrounding a second moveable member. The apparatus also includes an elastomer valve positioned between the first moveable member and the second moveable member. The first and second moveable members extend from the first and second solenoids to contact and open the elastomer valve when the first and second solenoids receive a first current. Further, the first and second moveable members retract towards the first and second solenoids to close the elastomer valve when the first and second solenoids receive a second current.

19 Claims, 6 Drawing Sheets

ACTUATED ELASTOMER VALVE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, the present disclosure provides an apparatus. The apparatus may include a first solenoid at least partially surrounding a first moveable member. The apparatus may also include a second solenoid at least partially surrounding a second moveable member. The apparatus may also include an elastomer valve positioned between the first moveable member and the second moveable member. The first and second moveable members may be configured to extend from the first and second solenoids to contact and open the elastomer valve when the first and second solenoids receive a first current. Further, the first and second moveable members may be configured to retract towards the first and second solenoids to close the elastomer valve when the first and second solenoids receive a second current.

In another aspect, the present disclosure provides a method. The method may include providing a first solenoid at least partially surrounding a first moveable member. The method may also include providing a second solenoid at least partially surrounding a second moveable member. The method may also include providing an elastomer valve positioned between the first moveable member and the second moveable member. The method may also include providing a first current to the first and second solenoids. The first current may cause the first and second moveable members to extend from the first and second solenoids. The extended first and second moveable members may be configured to contact and open the elastomer valve.

In yet another aspect, the present disclosure provides a balloon. The balloon may include an envelope, a bladder positioned inside of the envelope, and an altitude-control system. The altitude-control system may include a first solenoid at least partially surrounding a first moveable member. The altitude-control system may also include a second solenoid at least partially surrounding a second moveable member. The altitude-control system may also include an elastomer valve positioned between the first moveable member and the second moveable member. The first and second moveable members may be configured to extend from the first and second solenoids to contact and open the elastomer valve when the first and second solenoids receive a first current. Further, the first and second moveable members may be configured to retract towards the first and second solenoids to close the elastomer valve when the first and second solenoids receive a second current.

These as well as other aspects, advantages, and alternatives, will become apparent to those of ordinary skill in the art by reading the following detailed description, with reference where appropriate to the accompanying drawings.

DETAILED DESCRIPTION

Figure 1:
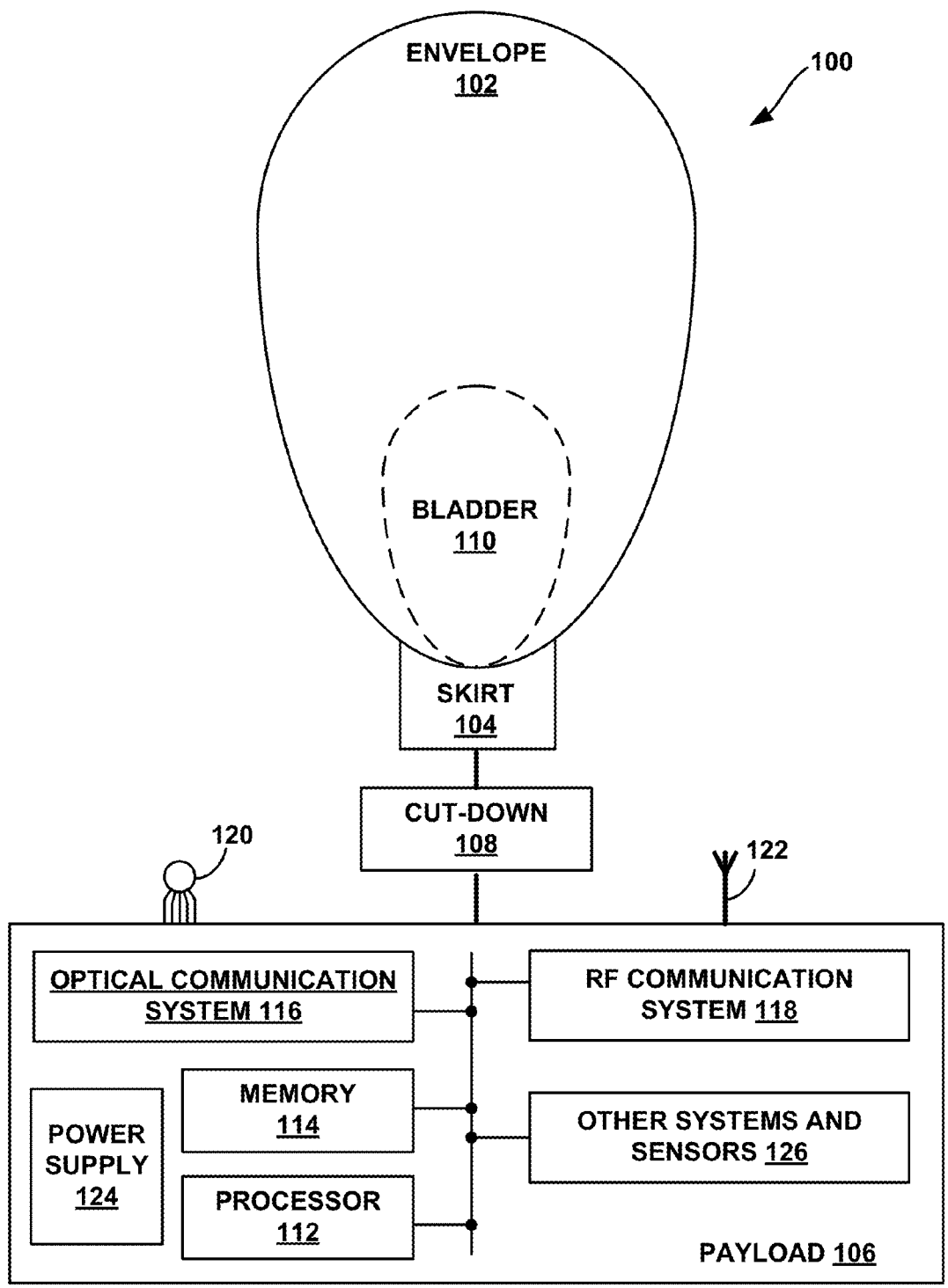
FIG. 1 is a simplified block diagram illustrating a high-altitude balloon, according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

I. OVERVIEW

Exemplary embodiments may generally relate to a data network formed by balloons, and in particular, to a mesh network formed by high-altitude balloons deployed in the stratosphere. In order that the balloons can provide a reliable mesh network in the stratosphere, where winds may affect the locations of the various balloons in an asymmetrical manner, the balloons in an exemplary network may be configured move latitudinally and/or longitudinally relative to one another by adjusting their respective altitudes, such that the wind carries the respective balloons to the respectively desired locations.

In some embodiments, each balloon in the balloon network may include an altitude-control system, which may be configured to adjust altitude of the high-altitude balloon. In an exemplary embodiment, the altitude-control system of such a balloon may adjust the density of lift gas in the balloon envelope through use of an actuated valve, in order to effectuate the altitudinal adjustments. Such an actuated valve may allow gas out of the envelope, resulting in a change in the altitude of the balloon. In another embodiment, the actuated valve may be used to seal pressurized air inside of a bladder located inside of the envelope, thereby controlling the flow of gases from the bladder. Such an actuated valve may allow gas out of bladder, resulting in a change in the altitude of the balloon. Other uses for such actuated valves are possible as well.

High-altitude balloons may operate in extreme cold and high temperatures with minimal power availability, and components of the balloons should therefore be operable in such conditions. Accordingly, an exemplary embodiment provides an actuated valve that may be able to operate in extreme temperatures and/or may require less power to operate than other configurations for opening and closing an envelope or bladder.

An example embodiment of an actuated valve may include two solenoids that are used to actuate an elastomer valve, such as a four-way cuspid valve. In one embodiment, the elastomer valve may include silicone rubber or silicone polymer blends. The elastomer valve may be placed between a first solenoid and a second solenoid. The first solenoid may be at least partially surrounding a first moveable member, and the second solenoid may be at least partially surrounding a second moveable member. The two solenoids may be positioned so that the first moveable member is facing the second moveable member on opposite sides of the elastomer valve.

Using reverse polarity on the solenoids, the first and second moveable members move away from the first and second solenoids and compress the elastomer valve, thereby opening the valve. To close the valve, the polarity on the solenoids may be switched to non-reversed to return the first and second moveable members to their starting positions, thereby closing the valve. In one embodiment, latching solenoids may be used to utilize magnetic forces and springs to maintain the first and second moveable members in set positions without the constant application of an electrical current.

II. EXEMPLARY BALLOON CONFIGURATION

Various types of balloon systems may be incorporated in an exemplary balloon network. An exemplary embodiment may utilize high-altitude balloons, which typically operate in an altitude range between 17 km and 22 km. FIG. 1 is a simplified block diagram illustrating a high-altitude balloon 100, according to an exemplary embodiment. As shown, the balloon 100 includes an envelope 102, a skirt 104, a payload 106, and a cut-down system 108 that is attached between the envelope 102 and payload 106.

The envelope 102 and skirt 104 may take various forms, which may be currently well-known or yet to be developed. For instance, the envelope 102 and/or skirt 104 may be made of a highly-flexible latex material or may be made of a rubber material such as chloroprene. Other materials are also possible. Further, the shape and size of the envelope 102 and skirt 104 may vary depending upon the particular implementation. Additionally, the envelope 102 may be filled with various different types of gases, such as helium and/or hydrogen. Other types of gases are possible as well.

The payload 106 of balloon 100 may include a processor 112 and on-board data storage, such as memory 114. The memory 114 may take the form of or include a non-transitory computer-readable medium. The non-transitory computer-readable medium may have instructions stored thereon, which can be accessed and executed by the processor 112 in order to carry out the balloon functions described herein.

The payload 106 of balloon 100 may also include various other types of equipment and systems to provide a number of different functions. For example, payload 106 may include optical communication system 116, which may transmit optical signals via an ultra-bright LED system 120, and which may receive optical signals via an optical-communication receiver (e.g., a photo-diode receiver system). Further, payload 106 may include an RF communication system 118, which may transmit and/or receive RF communications via an antenna system 122. The payload 106 may also include a power supply 124 to supply power to the various components of balloon 100.

Further, payload 106 may include various types of other systems and sensors 126. For example, payload 106 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 106 includes an ultra-bright LED system 120 for free-space optical communication with other balloons. As such, optical communication system 116 may be configured to transmit a free-space optical signal by modulating the ultra-bright LED system 120. The optical communication system 116 may be implemented with mechanical systems and/or with hardware, firmware, and/or software. Generally, the manner in which an optical communication system is implemented may vary, depending upon the particular application.

In a further aspect, balloon 100 may be configured for altitude control. For instance, balloon 100 may include a variable buoyancy system, which is configured to change the altitude of the balloon 300 by adjusting the volume and/or density of the gas in the balloon 100. A variable buoyancy system may take various forms, and may generally be any system that can change the volume and/or density of gas in envelope 102.

In an exemplary embodiment, a variable buoyancy system may include a bladder 110 that is located inside of envelope 102. The buoyancy of the balloon 100 may therefore be adjusted by changing the density and/or volume of the gas in bladder 110. To change the density in bladder 110, balloon 100 may be configured with systems and/or mechanisms for heating and/or cooling the gas in bladder 110. Further, to change the volume, balloon 100 may include pumps or other features for adding gas to and/or removing gas from bladder 110. Additionally or alternatively, to change the volume of bladder 110, balloon 100 may include release valves or other features that are controllable to allow air to escape from bladder 110.

Further, a balloon 106 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system make then make adjustments to the density of the balloon chamber in order to effectuate the determined altitudinal adjustments and cause the balloon to move laterally to the desired direction and/or to the desired location. Alternatively, the altitudinal adjustments may be computed by a ground-based control system and communicated to the high-altitude balloon.

As shown, the balloon 100 also includes a cut-down system 108. The cut-down system 108 may be activated to separate the payload 106 from the rest of balloon 100. This functionality may be utilized anytime the payload needs to be accessed on the ground, such as when it is time to remove balloon 100 from a balloon network, when maintenance is due on systems within payload 106, and/or when power supply 124 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground.

III. EXAMPLE ACTUATED VALVE

As discussed above, each balloon in the balloon network may include an altitude-control system, which may be configured to adjust altitude of the high-altitude balloon. In one embodiment, the altitude-control system may adjust the density of lift gas in the balloon envelope, through use of an actuated valve, in order to effectuate the altitudinal adjustments. Such an actuated valve may allow gas out of the envelope, resulting in a change in the altitude of the balloon. In another embodiment, the actuated valve may be used to seal pressurized air inside of a bladder located inside of the envelope, thereby controlling the flow of gases from the bladder. Such an actuated valve may allow gas out of bladder, resulting in a change in the altitude of the balloon. Other uses for such actuated valves are possible as well.

High-altitude balloons may operate in extreme cold and high temperatures with minimal power availability, and components of the balloons should therefore be operable in such conditions. Accordingly, an exemplary embodiment provides an actuated valve that can operate in extreme temperatures and requires little power.

Figure 2:
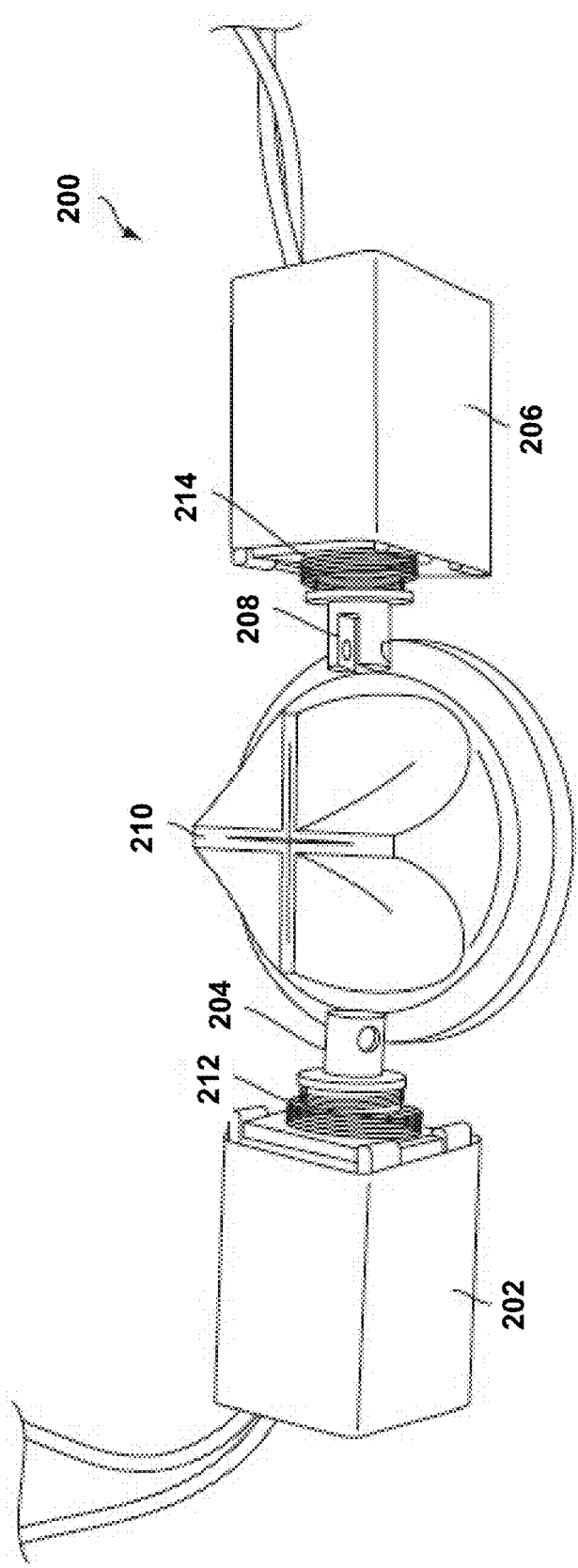
FIG. 2 is an example actuated elastomer valve, according to an exemplary embodiment.

FIG. 2 illustrates an actuated elastomer valve 200 according to an exemplary embodiment. The actuated valve 200 may include a first solenoid 202 at least partially surrounding a first moveable member 204. The actuated valve 200 may also include a second solenoid 206 at least partially surrounding a second moveable member 208.

The first and second solenoids 202, 206 may include an electromagnetically inductive coil, wound around the first and second moveable members 204, 208. The coil may be shaped such that the moveable members 204, 208 can be moved in and out of the center of the coil, altering the coil's inductance and thereby becoming an electromagnet. The force applied to the moveable members 204, 208 is proportional to the change in inductance of the coil with respect to the change in position of the moveable members 204, 208, and the current flowing through the coil. The force applied to the moveable members 204, 208 will move the moveable members 204, 208 in a direction that increases the coil's inductance.

High-altitude balloons may operate with a limited amount of available power. Accordingly, an actuated valve that can operate without the constant application of an electrical current may be desirable. In one embodiment, the first and second solenoids 202, 206 may be latching solenoids. Latching solenoids utilize an electrical pulse and/or one or more internal permanent magnets to maintain a set position without the constant application of an electrical current. There are two main types of latching solenoids: permanent magnetic latching solenoids and residual magnetism latching solenoids.

Permanent magnet latching solenoids utilize one or more permanent magnets in conjunction with the solenoid coil to maintain the position of the moveable member with no current applied. The one or more permanent magnets generate a small magnetic flux in the magnetic circuit generating an attraction of the moveable member towards the solenoid when no power is applied to the solenoid. When a short pulse of electrical current is applied to the coil, the resulting electromagnetic flux generated by the coil can either add to or subtract from the one or more permanent magnets flux depending on the polarity of the applied current. Further, springs 212, 214 may be used to bias the moveable member away from the one or more permanent magnets in an extended position.

In operation, a pulse of current may be applied to a permanent magnet latching solenoid to generate magnetic flux to add to the magnetic force of the one or more permanent magnets and move the moveable member to a retracted position. When the current is removed, the moveable member is held in the "latched" position by the one or more permanent magnets. Conversely, applying a reverse polarity pulse cancels the flux of the one or more permanent magnets, thereby allowing the spring to release the moveable member to the extended position.

Residual magnetism latching solenoids operate in much the same way as permanent magnet latching solenoids. However, residual magnetism latching solenoids maintain the latched position without the use of permanent magnets. Residual magnetism latching solenoids use the inherent residual magnetism common to all direct-current (DC) actuators. Latching the residual magnetism solenoid is accomplished by providing a short pulse of electrical current to pull-in and "latch" the moveable member. Unlatching the moveable member is accomplished by applying a pulse of lower current in the opposite polarity of what was used to latch the moveable member. Other embodiments of solenoids are possible as well.

Referring back to FIG. 2, an elastomer valve 210 may be placed between the first solenoid 202 and the second solenoid 206. The first and second solenoids 202, 206 may be positioned so that the first moveable member 204 is facing the second moveable member 208 on opposite sides of the valve 210. Further, the first and second solenoids 202, 206 may be positioned so that when the first and second moveable members 204, 208 are in a retracted position as shown in FIG. 2, they do not contact the sides of the valve 210. In another embodiment, the first and second solenoids 202, 206 may be positioned so that the first and second moveable members 204, 208 just barely contact the sides of the valve 210 when the moveable members are in the retracted position.

In another embodiment, shape memory alloys may be used to actuate the cuspid valve. In yet another embodiment, servos may be used to actuate the cuspid valve. Other embodiments are possible as well.

Figure 3A:
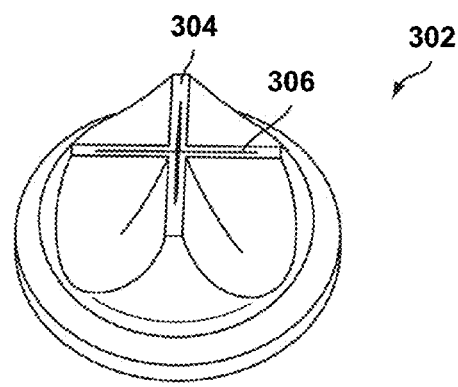
FIG. 3A is an example elastomer valve, according to an exemplary embodiment.
Figure 3B:
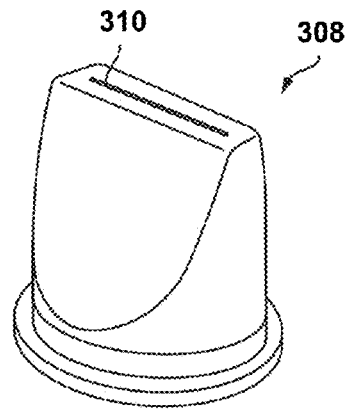
FIG. 3B is another example elastomer valve, according to an exemplary embodiment.
Figure 3C:
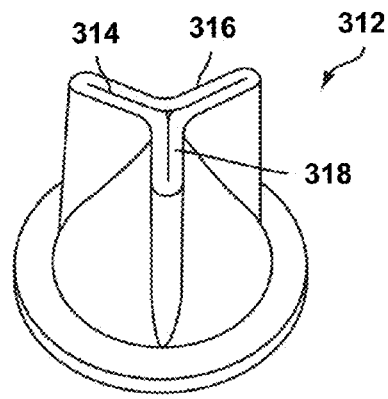
FIG. 3C is yet another example elastomer valve, according to an exemplary embodiment.

FIGS. 3A-3C illustrate various types of elastomer valves that may be used in at various embodiments of the apparatus. These example valves should not be viewed as limiting. It should be understood that other embodiments may include other valve designs.

The elastomer valve shown in FIG. 3A is a four-way cuspid valve 302 (or "cross slit valve"). Four-way cuspid valves require a small amount of force to open, and they stay shut with even greater force when the pressure on the valve increases. The four-way cuspid valve 302 includes a first slit 304 and a second slit 306. The second slit 306 may be positioned substantially perpendicular to the first slit 304. When the four-way cuspid valve 302 receives a force from opposite sides of the first slit 304 and/or the second slit 306, the valve opens allowing gas or liquid to pass through the valve.

The elastomer valve shown in FIG. 3B is a duckbill valve 308. Duckbill valves have elastomeric lips in the shape of a duckbill which prevent backflow and allow forward flow. The duckbill valve 308 includes a single slit 310. When the duckbill valve 308 receives a force from opposite sides of the single slit 310, the valve opens allowing gas or liquid to pass through the valve.

The elastomer valve shown in FIG. 3C is a trifold form of a duckbill valve, known as a joker valve (or "tricuspid valve"). Similar to the four-way cuspid valve and the duckbill valve, the joker valve is designed to require a small amount of force to open and allow forward flow, but prevent backflow by staying shut with even greater force when the pressure on the valve increases. The joker valve 312 includes a first slit 314, a second slit 316 and a third slit 318. The angle in between each slit may be one hundred and twenty degrees. When the joke valve 312 receives a force on the sides of one or more of the slits, the valve opens allowing gas or liquid to pass through the valve. In one embodiment, three solenoids may be used to actuated the valve by applying force to the each of the three slits. Other embodiments are possible as well.

The properties of the elastomer valve may be tailored by adjusting the geometry or composition of the valve. The elastomer valve may be made from silicone rubber or silicone polymer blends. Silicone rubber includes silicon together with carbon, hydrogen, oxygen, and sometimes other elements. Silicone rubber offers good resistance to extreme temperatures, being able to operate normally from approximately −55° C. to +300° C. Various fillers and other polymers may be added to adjust the properties of silicone rubber. Different silicone blends may affect the mechanical properties of the elastomer valve, so the composition of the valve may be tailored to optimize the properties of the valve depending on its desired usage (i.e., high-altitude ballooning). Further, the geometry of the elastomer valve may be adjusted as well. For example, the thickness of the slits in the valve, the height of the valve, and the width of the valve may affect the opening and shutting of the valve. These structural aspects of the valve may be tailored to optimize the properties of the valve depending on its desired usage.

Figure 4A:
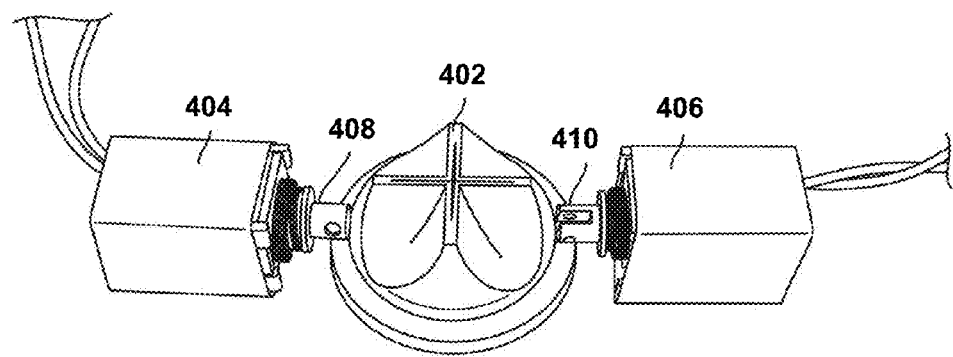
FIG. 4A is an example actuated elastomer valve in a closed position, according to an exemplary embodiment.
Figure 4B:
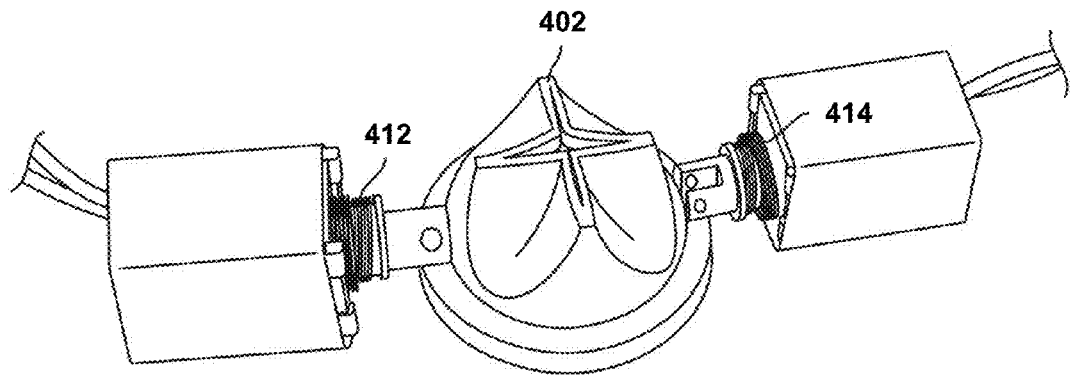
FIG. 4B is an example actuated elastomer valve in an opened position, according to an example embodiment.
Figure 4C:
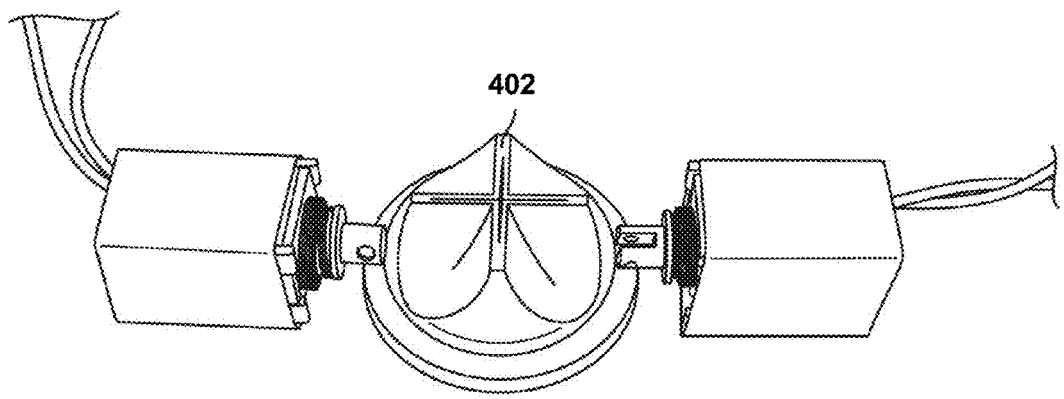
FIG. 4C is an example actuated elastomer valve in a closed position, according to an exemplary embodiment.

FIGS. 4A-4C illustrate an actuated elastomer valve in operation. FIGS. 4A-4C illustrate a four-way cuspid valve as the elastomer actuated valve. It should be understood that other elastomer actuated valves may be used, as described above in FIGS. 4A-4C. Further, FIGS. 4A-4C illustrate two solenoids that are used to actuate the elastomer valve. However, in at least one embodiment, one or more additional solenoids may be used.

In particular, FIG. 4A illustrates an elastomer actuated valve 402 in a closed position. In one embodiment, the first solenoid 404 and the second solenoid 406 are latching solenoids including permanent magnets configured to hold the first and second moveable members 408, 410 in a retracted position. In FIG. 4B, a reverse polarity pulse is applied to the first and second solenoids canceling the flux of the permanent magnets, thereby allowing the springs 412, 414 to release the moveable members to their extended positions. The extended moveable members contact the opposite sides of the elastomer valve 402, causing the elastomer valve 402 to open. In FIG. 4C, a non-reverse polarity pulse is applied to the first and second solenoids generating a magnetic flux to add to the magnetic force of the permanent magnets, thereby moving the moveable members to their retracted positions, causing the elastomer valve 402 to close.

In one embodiment, the current applied to the first and second solenoids may be controlled remotely. For example, the actuated valve may be in a high-altitude balloon. The current applied to the first and second solenoids may be controlled at ground level. In another embodiment, the current applied to the first and second solenoids may be controlled by the processor of the balloon. Other embodiments are possible as well.

IV. EXAMPLE ACTUATED VALVE IN A HIGH-ALTITUDE BALLOON

Figure 5:
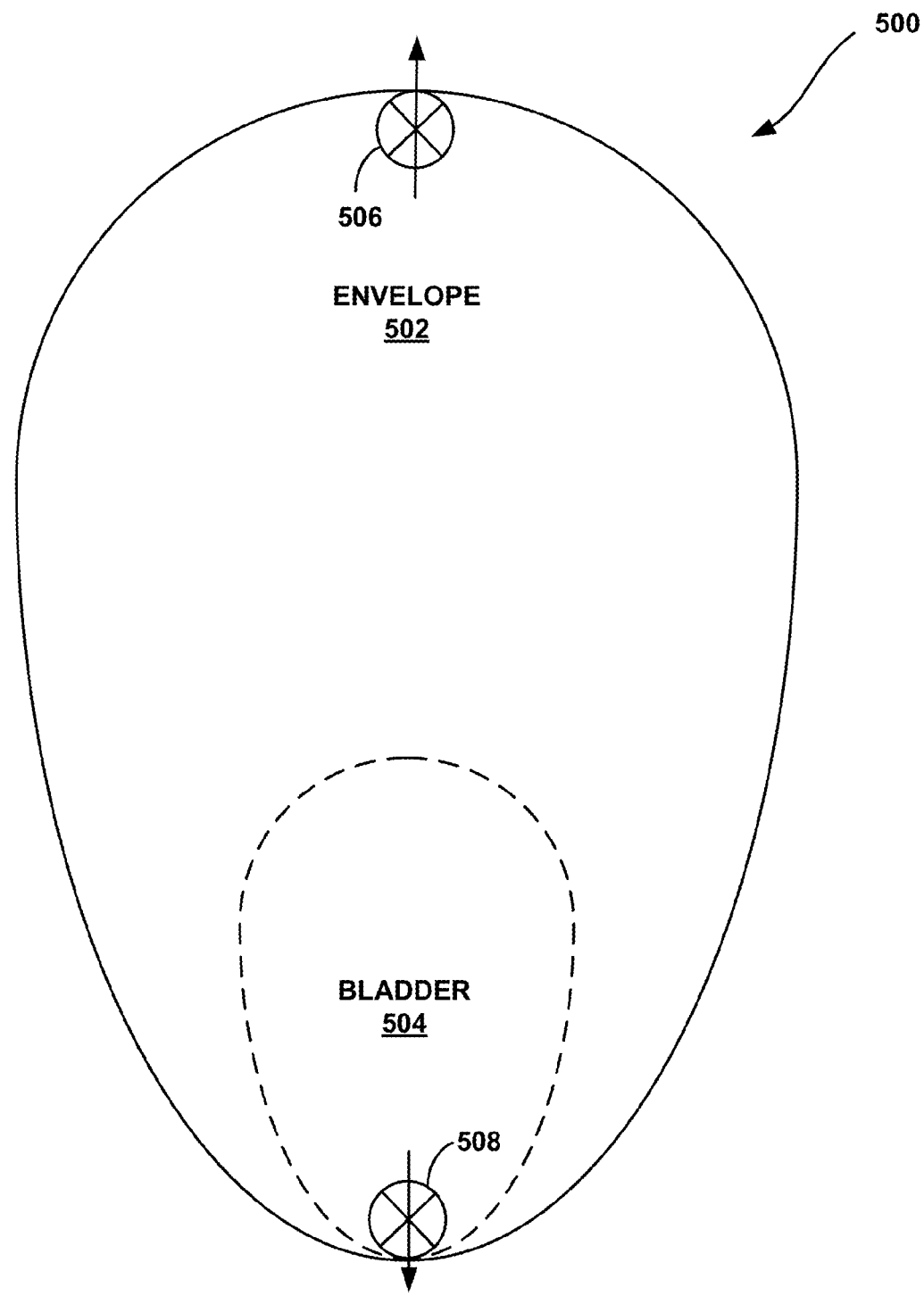
FIG. 5 is a simplified block diagram illustrating a high-altitude balloon with an actuated elastomer valve, according to an exemplary embodiment.

FIG. 5 is a simplified block diagram illustrating a high-altitude balloon 500 with an actuated elastomer valve, according to an exemplary embodiment. As discussed above in relation to FIG. 1, the balloon 500 may include an envelope 502 and a bladder 504 that is located inside of envelope 502. In one embodiment, an elastomer actuated valve as described above may be used as a top valve 506. Such an elastomer valve 506 may be located at the top of the balloon 500 and enables the balloon 500 to vent lift gas from the envelope 502. Venting lift gas from the envelope 502 may enable the balloon 500 to engage in controlled ascent and controlled descent. The elastomer valve 506 allows pressurized lift gas to escape from the inside of the balloon to the outside of the balloon, as shown by the arrow. The elastomer valve 506 is positioned to face the inside of the envelope 502, allowing the pressurized gas to help keep the valve 506 closed until actuation.

In another embodiment, an elastomer actuated valve as described above may be used to seal pressurized air inside of the bladder 504 of the balloon 500. Such an elastomer valve 508 may be located at the bottom of the balloon 500 and may enable the balloon 500 to control the flow of gases from the bladder 504. The valve 508 may allow gas out of bladder 504, resulting in a change in the altitude of the balloon 500. The elastomer valve 508 is positioned to face the inside of the bladder 504, allowing the pressurized gas to help keep the valve 508 closed until actuation. Other embodiments and uses of the actuated valve are possible as well.

V. EXAMPLES OF METHODS

Figure 6:
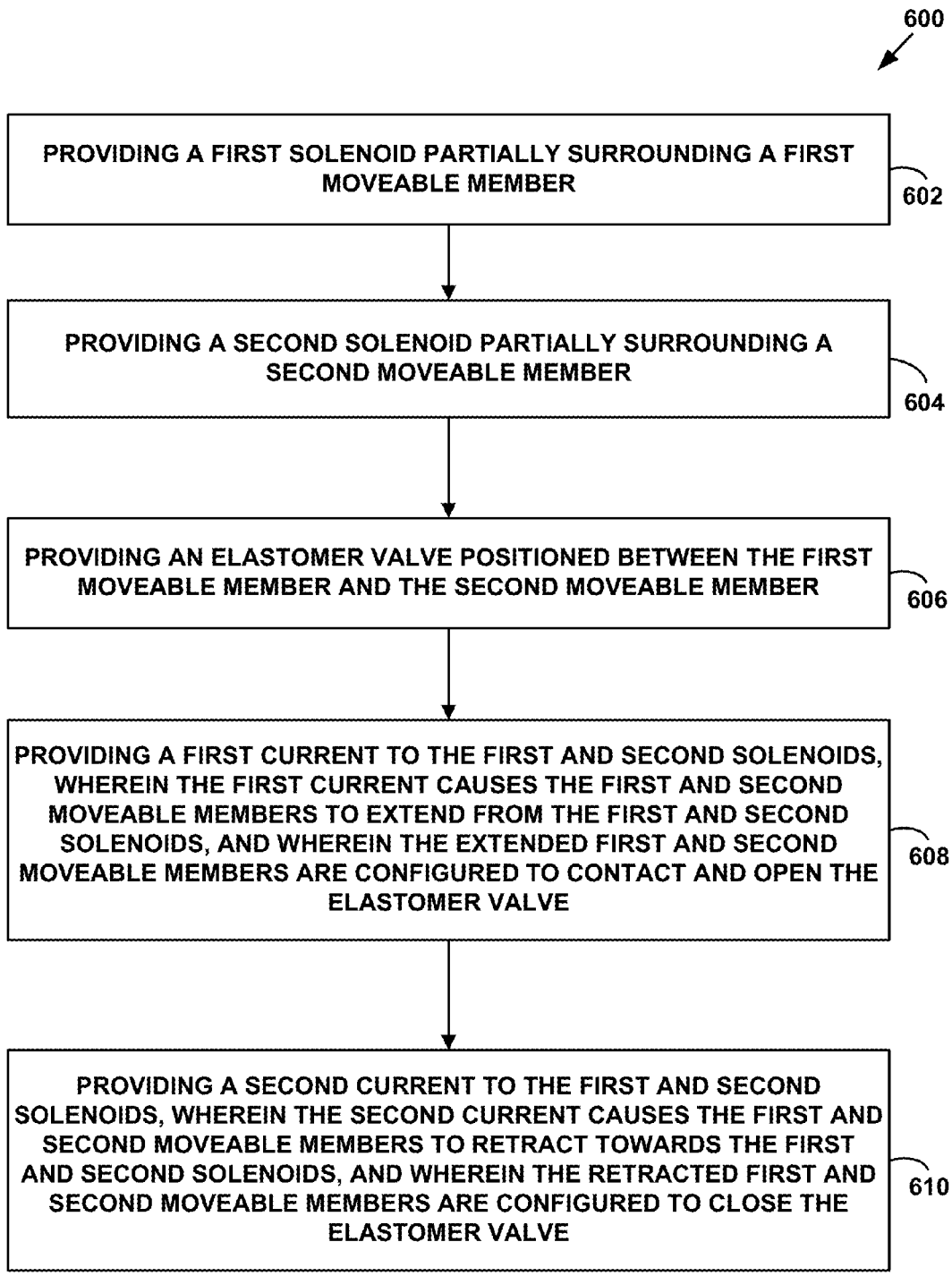
FIG. 6 depicts a flow chart, in accordance with an example embodiment.

FIG. 6 is a simplified flow chart illustrating method 600, according to an exemplary embodiment. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 602, method 600 involves providing a first solenoid at least partially surrounding a first moveable member. The first solenoid may be a latching solenoid, as described above. At block 604, method 600 involves providing a second solenoid partially surround a second moveable member. The second solenoid may be a latching solenoid, as described above.

At block 606, method 600 involves providing an elastomer valve positioned between the first moveable member and the second moveable member. The elastomer valve may be a four-way cuspid valve, a duckbill valve, a joker valve, or another type of elastomer valve. The elastomer valve may include silicone rubber or silicone polymer blends, as described above.

At block 608, method 600 involves providing a first current to the first and second solenoids, wherein the first current causes the first and second moveable members to extend from the first and second solenoids, and wherein the extended first and second moveable members are configured to contact and open the elastomer valve. The opened elastomer valve may allow fluids to pass from one location to another location. At block 610, method 600 involves providing a second current to the first and second solenoids, wherein the second current causes the first and second moveable members to retract towards the first and second solenoids, and wherein the retracted first and second moveable members are configured to close the elastomer valve.

VI. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A balloon comprising:
   an envelope; and
   an apparatus coupled to the envelope, the apparatus comprising:
   a first solenoid at least partially surrounding a first moveable member;
   a second solenoid at least partially surrounding a second moveable member; and
   an elastomer valve positioned between the first moveable member and the second moveable member, wherein the first and second moveable members extend from the first and second solenoids to contact and open the elastomer valve when the first and second solenoids receive a first current, and wherein the first and second moveable members retract towards the first and second solenoids to close the elastomer valve when the first and second solenoids receive a second current.

2. The balloon of claim 1, wherein the first solenoid and the second solenoid are latching solenoids.

3. The balloon of claim 2, wherein the first solenoid and the second solenoid include one or more magnets.

4. The balloon of claim 1, wherein the elastomer valve is a four-way cuspid valve.

5. The balloon of claim 1, wherein the elastomer valve is a duckbill valve.

6. The balloon of claim 1, wherein the first current is reverse polarity, and wherein the second current is non-reversed polarity.

7. The balloon of claim 1, wherein the apparatus further comprises:
   a first spring between the first solenoid and the first moveable member; and
   a second spring between the second solenoid and the second moveable member, wherein the first and second springs bias the first and second moveable members towards the elastomer valve.

8. A method comprising:
   providing a balloon including an envelope;
   providing a first solenoid at least partially surrounding a first moveable member;
   providing a second solenoid at least partially surrounding a second moveable member;
   providing an elastomer valve positioned between the first moveable member and the second moveable member, wherein the elastomer valve is coupled to the envelope;
   providing a first current to the first and second solenoids, wherein the first current causes the first and second moveable members to extend from the first and second solenoids, and wherein the extended first and second moveable members contact and open the elastomer valve; and
   providing a second current to the first and second solenoids, wherein the second current causes the first and second moveable members to retract towards the first and second solenoids, and wherein the retracted first and second moveable members cause the elastomer valve to close.

9. The method of claim 8, wherein the first solenoid and the second solenoid are latching solenoids.

10. The method of claim 8, wherein the elastomer valve is a four-way cuspid valve.

11. The method of claim 8, wherein the elastomer valve is a duckbill valve.

12. The method of claim 8, wherein the first current is reverse polarity.

13. The method of claim 8, wherein the second current is non-reversed polarity.

14. The method of claim 8, further comprising:
    providing a first spring between the first solenoid and the first moveable member; and
    providing a second spring between the second solenoid and the second moveable member, wherein the first and second springs bias the first and second moveable members towards the elastomer valve.

15. A balloon comprising:
    an envelope;
    a bladder positioned inside of the envelope; and
    an altitude-control system, wherein the altitude-control system comprises:
    a first solenoid at least partially surrounding a first moveable member;
    a second solenoid at least partially surrounding a second moveable member; and
    an elastomer valve positioned between the first moveable member and the second moveable member, wherein the first and second moveable members extend from the first and second solenoids to contact and open the elastomer valve when the first and second solenoids receive a first current, and wherein the first and second moveable members retract towards the first and second solenoids to close the elastomer valve when the first and second solenoids receive a second current.

16. The balloon of claim 15, wherein the first solenoid and the second solenoid are latching solenoids.

17. The balloon of claim 15, wherein the elastomer valve is a four-way cuspid valve.

18. The balloon of claim 15, wherein the first current is reverse polarity, and wherein the second current is non-reversed polarity.

19. The balloon of claim 15, wherein the altitude-control system further comprises:
    a first spring between the first solenoid and the first moveable member; and
    a second spring between the second solenoid and the second moveable member, wherein the first and second springs bias the first and second moveable members towards the elastomer valve.

* * * * *